United States Patent Office 2,719,401
Patented Oct. 4, 1955

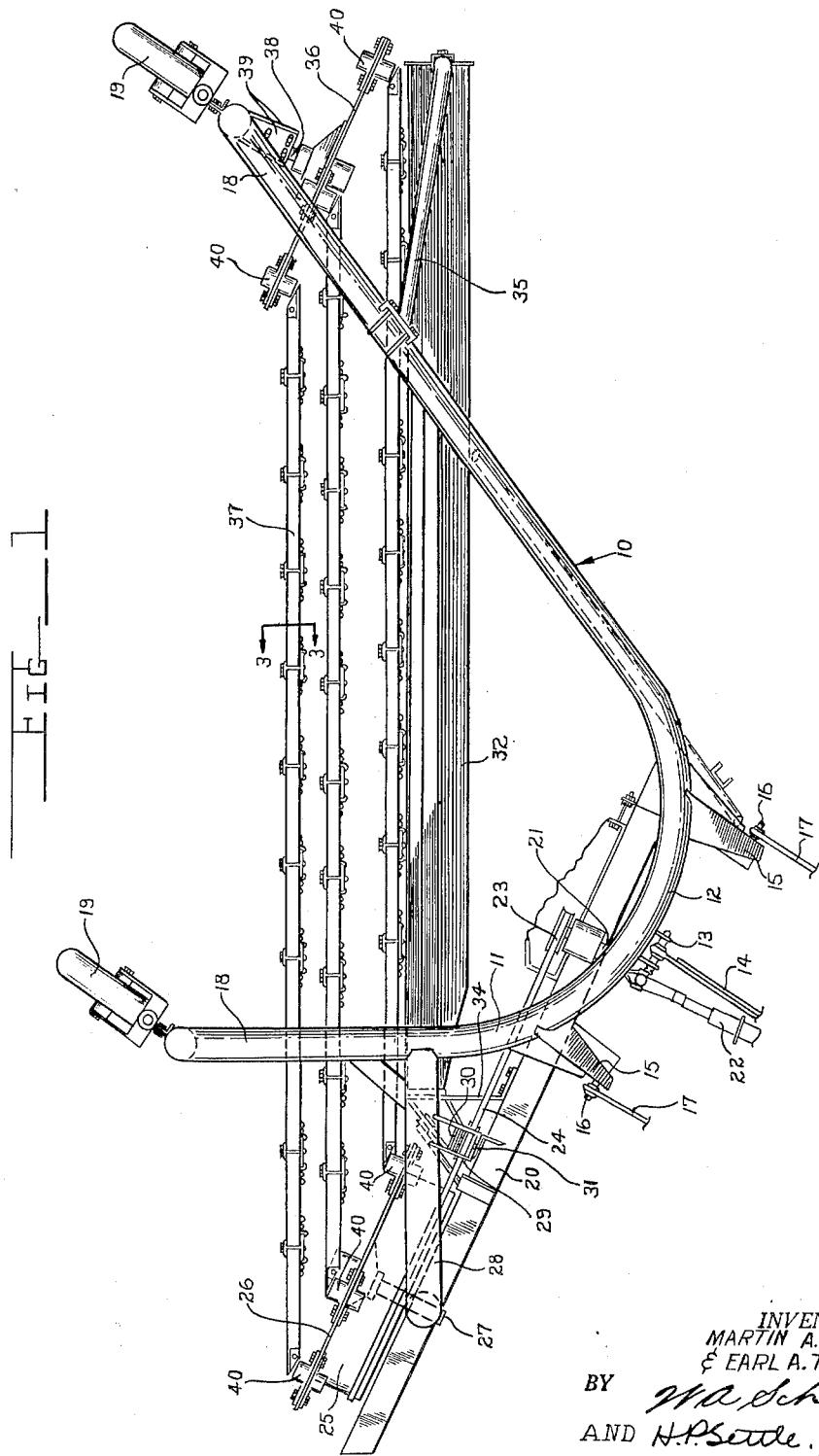

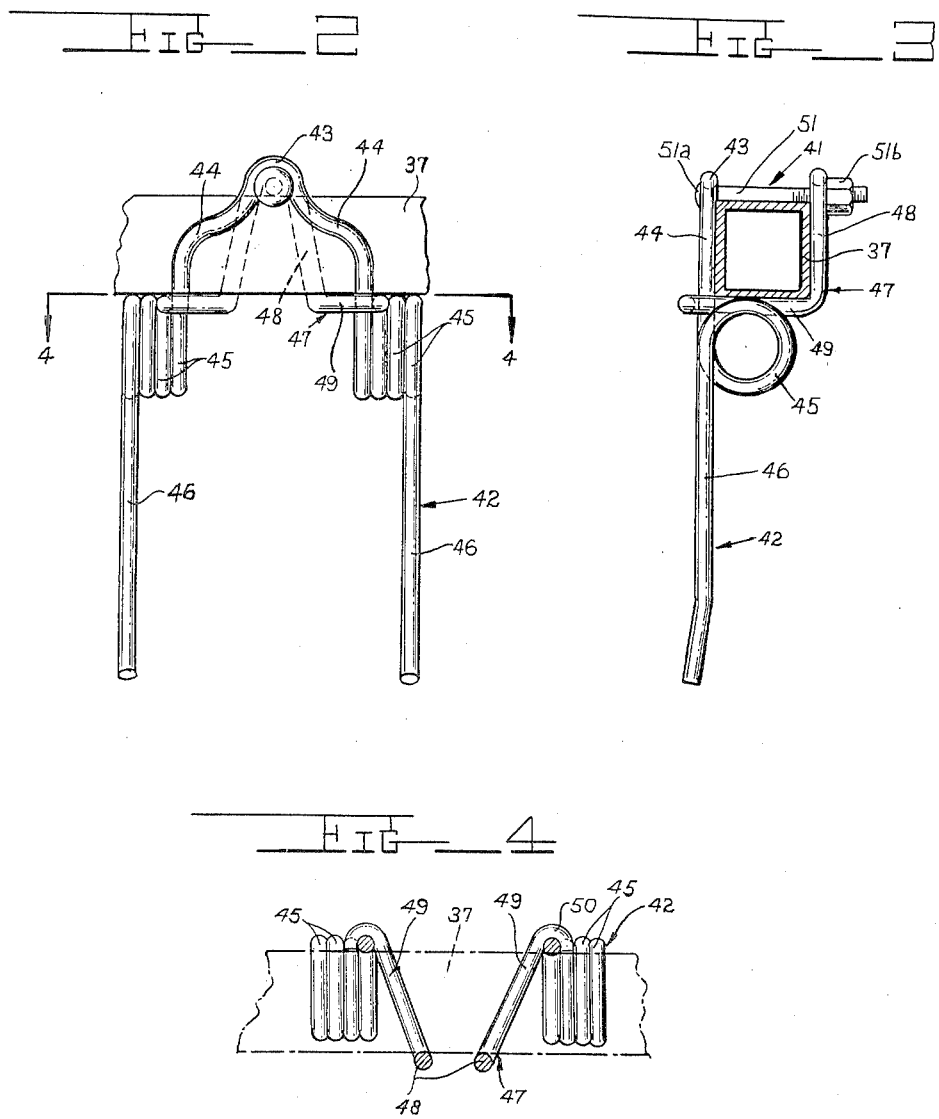

2,719,401

RAKE TOOTH BAR ASSEMBLY

Martin A. Erickson and Earl A. Thorwall, Detroit, Mich., assignors, by mesne assignments, to Ford Motor Company, Dearborn, Mich., a corporation of Delaware Application September 18, 1952, Serial No. 310,277

9 Claims. (Cl. 56—400)

This invention relates to a side delivery rake and more particularly, to a rake tooth mounting and stripping assembly for such a rake having a rotary raking reel.

In the conventional side delivery rake, the rake teeth are mounted upon tooth bars which form the periphery of a cylindroidal raking reel, the teeth usually being secured to the associated tooth bar by a bolt traversing the bar and extending through registering apertures in the bar and the tooth. The bolt apertures actually weaken the tooth bar, but the provision of the bolt extending through the bar has been necessary to fix the tooth longitudinally of the bar in order to prevent interference of the tooth with the stripper bar basket which partially encloses the reel. Thus, the fixing of the teeth to the bar has weakened the bars so that bar failure is likely to occur at relatively high raking speeds.

The present invention provides an improved side delivery rake particularly adapted for high speed operation and in which the teeth are secured to the tooth bars without the necessity of aperturing the bars. More particularly, the present invention contemplates the employment of a polygonal tooth bar to which a plurality of spaced rake teeth are clamped by securing means entirely external of the bar upon which the teeth are mounted. In addition, the teeth are employed in conjunction with a rotating stripper bar instead of the more conventional stripper basket, so that any slight longitudinal movement of the teeth along the associated bar does not cause tooth-stripper basket interference.

The advantages of providing a uniform, non-apertured tooth bar, the clamping of the tooth assembly to the bar by the use of external clamping means, and the lack of interference between the teeth and the rotating stripper will be readily appreciated.

It is, therefore, an important object of the present invention to provide an improved rake tooth and tooth bar assembly of improved strength and raking efficiency particularly adapted for high speed raking operations.

Another important object is the provision of a raking reel having a tooth bar of polygonal cross section and a tooth assembly secured to the bar by fastening means entirely exterior of the bar.

It is a further object to provide a side delivery rake wherein raking teeth are clamped to a tooth bar by fastening means exterior of the bar for cooperation with a rotating stripper element, so that the teeth will not interfere with the stripper element even when the teeth are shifted longitudinally of the bar.

Still another important object is the provision of a reel for a side delivery rake wherein each of the rake tooth bars is of polygonal cross section and each of the rake teeth is secured to the associated bar by a retaining element and a fastening means cooperating with the tooth, with the tooth, the retaining element, and the fastening means being in full peripheral contact with that section of the associated tooth bar to which the tooth is secured.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a plan view of a side delivery rake provided with a reel and stripping assembly of the present invention;

Figure 2 is an enlarged fragmentary elevational view of a rake tooth assembly and tooth bar of the rake of Figure 1;

Figure 3 is an enlarged sectional view taken along the plane 3—3 of Figure 1; and Figure 4 is a sectional view taken along the plane 4—4 of Figure 2.

As shown on the drawings:

In Figure 1, reference numeral 10 refers generally to a side delivery rake of the present invention generally similar to that disclosed in the pending application of Clarence B. Richey, Serial No. 136,305, filed December 31, 1949, now Patent No. 2,641,895 granted June 16, 1953, and assigned to the assignee of the present invention.

The rake 10 generally comprises a U-shaped tubular main frame 11 having a central bight portion 12 provided with a clevis 13 attachable to the top link 14 of a tractor, such as the Ford tractor, and depending plates 15 carrying laterally directed attachment pins 16 adapted for connection to the draft links 17 of the tractor. The frame 11 is provided at the downturned rear ends of the trailing leg portions 18 with a pair of caster wheels 19 preserving to aid in supporting the rake 10 when the same is in operating position.

The frame also carries a laterally extending beam 20 projecting laterally outwardly of the frame at the leading side thereof to support a driving mechanism for the rake including a driving shaft 21 adapted to be coupled to the power-take-off extension 22 of the tractor and carrying a sheave 23 lapped by a V-belt 24. The V-belt 24 is trained about an annular flange 25 rigidly secured to or integrally formed with a reel disc 26 disposed for rotation upon a spindle 27 which is supported on a tubular leg 28 rigid with the frame 10 and depending therefrom. The belt 24 also laps a sheave 29 to drive the same and a sheave 30 mounted upon a common spindle 31 with the sheave 29. The second sheave 30 is effective to drive a rotatable stripper element 32 journalled at its forward end in a mounting plate 34 carried by the beam 20 and supported at its rear end by a depending arm 35 clamped to the rear leg 18 of the frame 10.

The reel disc 26 cooperates with a second disc 36 generally parallel to the disc 26 to retain therebetween a plurality of rake tooth bars 37. The plate 36 is rotatably disposed upon a spindle 38 carried by a pair of superimposed plates 39, one of which is secured to the downturned terminal end of the rear leg 18 of the frame 10.

The tooth bars 37 are supported at their ends upon spindles forming a part of bearings 40 mounted adjacent the peripheries of the discs 26 and 36, respectively, and rotatable therewith. The tooth bars 39 and the end plates or discs 26 and 36 cooperably define a cylindroidal raking reel driven by the power-take-off extension 22 of the tractor for rotation about a generally horizontal axis which is inclined with respect to the path of travel of the rake and of the tractor or prime mover to which the rake is attached.

The tooth bars 37 are polygonal in cross-section, as best illustrated in Figure 3, and the tooth bars 37 each carry along the length thereof a plurality of spaced tooth assemblies, indicated generally at 41. More particularly, the tooth bar assemblies 41 include a tooth element, indicated generally at 43, the tooth element including a central generally U-shaped bight section 43 projecting above the upper surfaces of the tooth bar 37 and having identical depending and divergent bight sections 44 in flatwise engagement with one surface, namely the leading surface, of the polygonal tooth bar 37.

Each of the portions 44 of the bight of the tooth element 42 blend smoothly with a plurality of integrally formed helical coils 45 generally underlying the associated tooth bar 37 and preferably in contact with the undersurface thereof. The terminal convolution of each of the helical coils 45 is deformed downwardly to define a tooth extension or leg 46 substantially vertically aligned with the bight sections 44 and the bight 43 of the tooth element to provide raking teeth extensions lying substantially in the plane of the tooth element bight portion 43.

The tooth elements 42 are retained upon the tooth bar 37 by clip-like retaining elements 47. The retaining elements 47 include an upper generally U-shaped bight 48, the enclosed portion of which projects above the tooth bar 37 in transverse alignment with the central bight 43 of the tooth element 42. The bight portion 48 of the retaining element 47 is in contact with the surface of the tooth bar 37 which is directly opposite to that surface of the tooth bar contacted by the tooth element 44, and the bight section 48 blends smoothly with a pair of divergent leg extensions 49 contacting the undersurface of the tooth bar 37 intermediate the coils 45 of the tooth elements 42. The leg extensions 49 project beneath the tooth bar beyond the plane of the tooth elements 42 immediately adjacent the first convolution of the helical tooth portions 45, and the leg extensions 49 terminate in outwardly directed re-entrant hook portions 50 partially encircling the adjacent portions of the tooth element immediately beneath the tooth bar 37.

The retaining elements 42 are each secured individually to the associated tooth bar 37 by fastening means, such as a bolt 51, projecting through the bight portions of the tooth element and the retaining element above the tooth bar 37. For example, the illustrated bolt 51 extends through the registering bight portions with the bolt head 51a abutting the tooth element and the bolt nut 51b abutting the retaining element to clamp the same tightly against the tooth bar.

During operation of the rake, the reel is rotated by means of the tractor power-take-off and the teeth terminal legs 46 are effective to elevate hay and to move the same laterally of the rake in the manner well-known in the art. The rotary stripper 32 is effective to aid in stripping the elevated hay from the rake teeth, as fully explained in the above identified Richey application. It will be appreciated that any lateral displacement of the teeth 42 along the length of the associated tooth bar 37 will not interfere with the stripping action of the rotary stripper, since there are no stripping elements interposed between the individual tooth elements.

It will be seen that the tooth assembly is firmly clamped to the polygonal tooth bar and the snug engagement of the tooth assembly with the tooth bar prevents displacement of the tooth assembly with respect to the bar under the resistance offered by the hay during raking. It will also be appreciated that the bars 37 are not weakened by drilling of the same to accommodate the passage of fastening bolts or the like therethrough, nor is it necessary to accurately drill such apertures, as in the conventional type of rake, thereby materially reducing the manufacturing cost of the tooth and bar assembly. Further, the number of teeth and the spacing of the teeth may be varied as required by crop conditions. These variations may be made by virtue of the clamping engagement of the teeth with the tooth bars and the impossibility of interference of the teeth with the rotary stripper.

The assembly of the tooth and retaining elements upon the tooth bar may be readily accomplished by merely placing the tooth against the bar with the tooth coils 45 contacting the undersurface of the bar, then positioning the retaining element so that the hook-like ends 50 encircle the adjacent tooth portions, following which the retaining element may be positioned, as illustrated in Figure 3, and the fastening means 51 inserted through the registering bight portions.

Those skilled in the art will appreciate the simplicity of the tooth bar and tooth arrangement of the present invention, the ease of manufacturing and assembling the reel components, the strength and deflection resistance of the non-apertured tooth bars, and the practically foolproof operation of the reel and stripper bar assembly since there is no possibility of interference of the teeth with the stripper upon lateral tooth displacement.

It will, of course, be understood that various details of construction may be varied through a wide range without departing from the principles of this invention and it is, therefore, not the purpose to limit the patent granted hereon otherwise than necessitated by the scope of the appended claims.

We claim:

1. In a side delivery rake, an elongated tooth bar of polygonal cross-section, a rod-like tooth element having a central portion lying flatwise against one side of said bar and projecting thereabove to define a bight portion, said tooth element having depending legs freely extending beneath said one bar side and joined to said bight portion by coiled element portions forming a resilient connection therebetween to accommodate relative movement of said legs transversely of the associated tooth bar, a tooth retainer having a central section in flatwise contact with an opposing side of said bar and projecting thereabove to define a bight portion overlying said opposing side in alignment with the bight portion of said tooth element, said retainer having terminal hook-like ends at least partially encircling the bight portion of said tooth element to retain said tooth element in flatwise engagement with said bar one side, and fastening means entirely external of said bar joining the bight portions of the tooth element and said retainer to secure the same to said bar.

2. In a side delivery rake, a tooth bar of rectangular configuration, a tooth element depending from said bar and having an upper portion snugly abutting one side of said bar, a clamping element having an upper portion abutting an opposing side of said bar and a lower portion extending beneath said bar into engagement with said tooth element, and bolt means traversing said bar outside the confines of said bar in opposing relation to said clamping element lower portion to contact said tooth element and said clamping element for removably securing the elements to said bar.

3. In a side delivery rake, a tooth bar of polygonal cross-section, a tooth element having a central bight portion lying in the plane of one side of said bar and a depending free tooth extension lying substantially in said plane, said tooth element also having a plurality of integrally formed helical spring coils lying only partially in said plane and joining said tooth extension to said bight portion to accommodate deflection of said tooth extension from said plane, a clamping element snugly abutting the tooth bar in substantially opposed relation to said tooth element bight portion and having a terminal extension engaging said tooth element immediately adjacent the coils thereof to urge said tooth element into engagement with said tooth bar, and fastening means joining said tooth element and said clamping element exteriorly of said tooth bar to clamp said elements against said tooth bar.

4. In a side delivery rake, a polygonal tooth-supporting bar, a tooth element, and a retaining element, each of said elements being in flatwise contact with at least one side of said bar to project beyond opposing edges of the associated one side of said bar, said tooth element having a resilient integrally formed tooth extension and said retainer elements having a terminal portion partially encircling said tooth element adjacent said extension to retain said tooth element in snug flatwise contact with the bar, and fastening means entirely external of said bar joining the said elements at those portions thereof projecting beyond said bar and remote from said tooth extension and said terminal portion, respectively, to clamp said elements to said tooth bar.

5. In a side delivery rake, a tooth bar of rectangular cross-section, a spring tooth in flush engagement with one side of said bar and having an upstanding bright and a depending tooth extension each projecting beyond said bar, a tooth clamping element having an upstanding bight extending beyond said bar in opposed and aligned relation to the bight of said tooth and a clamping extension projecting transversely of said bar into engagement with said tooth, and a transversely extending fastening element entirely outside the confines of said bar joining the bights of said tooth and said clamping element to secure the same to said tooth bar.

6. In a side delivery rake, an elongated tooth supporting bar, a tooth element abutting said bar, clamping means entirely external of said bar releasably clamping said tooth to said bar, means supporting said bar and said tooth for rotation about a horizontal axis, a rotatable stripping element, and means supporting said stripping element for rotation about an axis generally parallel to the axis of rotation of said tooth bar, whereby said tooth can be moved longitudinally of said bar without contacting said stripping element.

7. In a side delivery rake, a tooth bar of rectangular cross-section, a spring tooth in flush engagement with one side of said bar and having an upstanding bight and a depending tooth extension each projecting beyond said bar, a tooth clamping element having an upstanding bight extending beyond said bar in opposed and aligned relation to the bight of said tooth and a clamping extension projecting transversely of said bar into engagement with said tooth, and a transversely extending fastening element entirely outside the confines of said bar joining the bights of said tooth and said clamping element to secure the same to said tooth bar, means supporting said tooth bar and said tooth assembly for rotation about a horizontal axis, a rotatable stripping element, and means supporting said stripping element for rotation about an axis generally parallel to the axis of rotation of said tooth bar and tooth assembly.

8. In a side delivery rake, a tooth bar of rectangular configuration, a tooth element depending from said bar and having an upper portion snugly abutting one side of said bar, a clamping element having an upper portion abutting an opposing side of said bar and a lower portion extending beneath said bar into engagement with said tooth element, and bolt means traversing said bar externally thereof in opposing relation to said clamping element lower portion to contact said tooth element and said clamping element for removably securing the elements to said bar, means supporting said tooth bar and said tooth assembly for rotation about a horizontal axis, a rotatable stripping element, and means supporting said stripping element for rotation about an axis generally parallel to the axis of rotation of said tooth bar and tooth assembly.

9. In a side delivery rake, a raking reel and stripping assembly comprising a pair of spaced end plates, a plurality of circumferentially spaced tooth bars of polygonal cross-section journalled by and extending between said end plates, bearing means journaling said reel for rotation about a horizontal axis, a plurality of tooth elements and associated clamping elements positioned in spaced relation along each of said tooth bars, means retaining said elements on said bar, said elements and said retaining means being entirely exterior of said bar and being adjustable longitudinally of said bar, a rotatable stripping element positioned in advance of and wholly exteriorly of said raking reel in juxtaposition thereto, and means supporting said stripping element for rotation about an axis generally parallel to and generally horizontally aligned with the axis of rotation of said raking reel whereby adjustment of said tooth element is accommodated without interference with said stripping element.

References Cited in the file of this patent

UNITED STATES PATENTS

| | | |
|---|---|---|
| 2,193,138 | Meyer | Mar. 12, 1940 |
| 2,237,002 | Kelley | Apr. 1, 1941 |
| 2,388,212 | McElhoe et al. | Oct. 30, 1945 |